United States Patent [19]

Spindler et al.

[11] 4,025,374
[45] May 24, 1977

[54] METHOD FOR PRODUCING CLOSING MEMBERS FOR SUPPORTING HOOKS OR EYES

[75] Inventors: Siegfried Wolfram Spindler, Schondorf; Manfred Rudi Köhler, Unterpfaffenhofen, both of Germany

[73] Assignee: Ries GmbH Bekleidungsverschlussfabrik, Unterpfaffenhofen, Germany

[22] Filed: Jan. 17, 1975

[21] Appl. No.: 541,828

[30] Foreign Application Priority Data

Jan. 17, 1974 Germany .......................... 2402212
July 26, 1974 Germany .......................... 2436125

[52] U.S. Cl. ............................ 156/73.1; 156/251; 156/273
[51] Int. Cl.² ........................................ B29C 27/08
[58] Field of Search .......... 24/201 HE, 201 C, 203; 112/406, 407; 2/265, 266; 428/99, 507; 156/73.1, 580, 73.3, 88, 251, 289, 273

[56] References Cited

UNITED STATES PATENTS

| 2,364,870 | 12/1944 | Otto | 156/289 |
|---|---|---|---|
| 2,440,664 | 4/1948 | Irons | 156/289 |
| 2,638,963 | 5/1953 | Frederick et al. | 156/251 |
| 2,861,276 | 11/1958 | Alfandre | 112/407 |
| 2,898,257 | 4/1959 | Carver | 156/289 |
| 3,033,257 | 5/1962 | Weber | 156/251 |
| 3,500,509 | 3/1970 | Moden | 2/266 |
| 3,513,052 | 5/1970 | Ariyasu et al. | 156/251 |
| 3,530,813 | 9/1970 | Roseman | 24/203 X |
| 3,657,033 | 4/1972 | Sager | 156/73.3 |
| 3,764,442 | 10/1973 | Parry | 156/580 |
| 3,790,992 | 2/1974 | Herz | 24/201 C |
| 3,817,802 | 6/1974 | Meyer | 156/289 |
| 3,859,150 | 1/1975 | Amburg | 156/251 |

FOREIGN PATENTS OR APPLICATIONS 941,808 11/1963 United Kingdom ................. 24/203

OTHER PUBLICATIONS

IBM Technical Disclosure Bulletin, Ultrasonic Cutting Tool, P. D. Bixby and J. J. Gyles, vol. 14, No. 12, May 1972.

Primary Examiner—Douglas J. Drummond
Attorney, Agent, or Firm—Sughrue, Rothwell, Mion, Zinn & Macpeak

[57] ABSTRACT

A method and apparatus for simplifying the production of closing members from a continuous tape having supporting hooks or eyes, for use in undergarments and the like. Zones of separation are produced between individual closing members by ultrasonic linear welding as the tape is advanced in steps.

6 Claims, 8 Drawing Figures

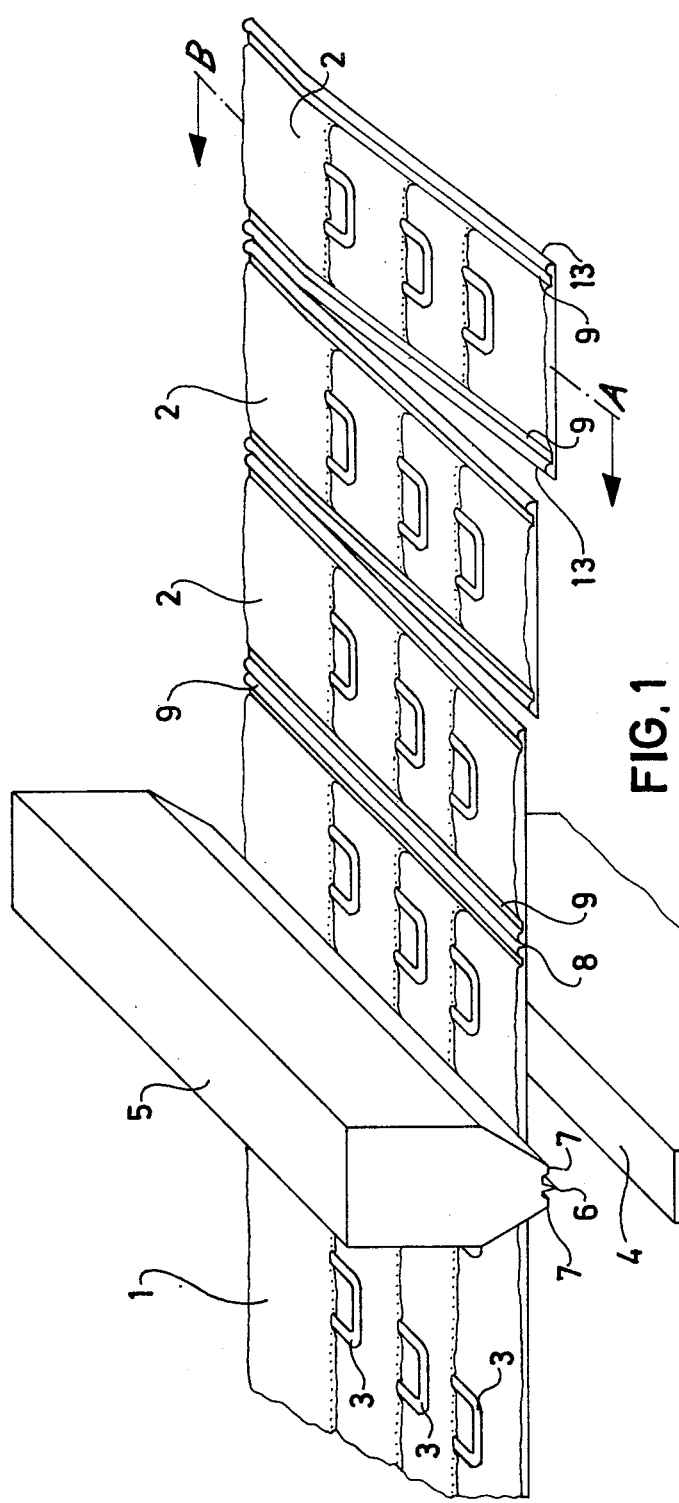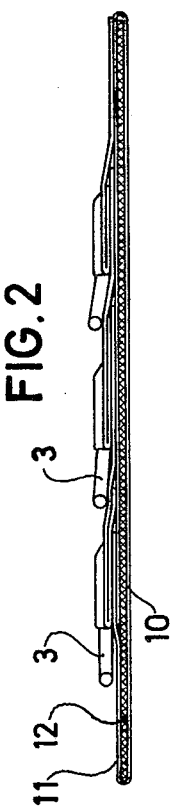
FIG.1
FIG.2

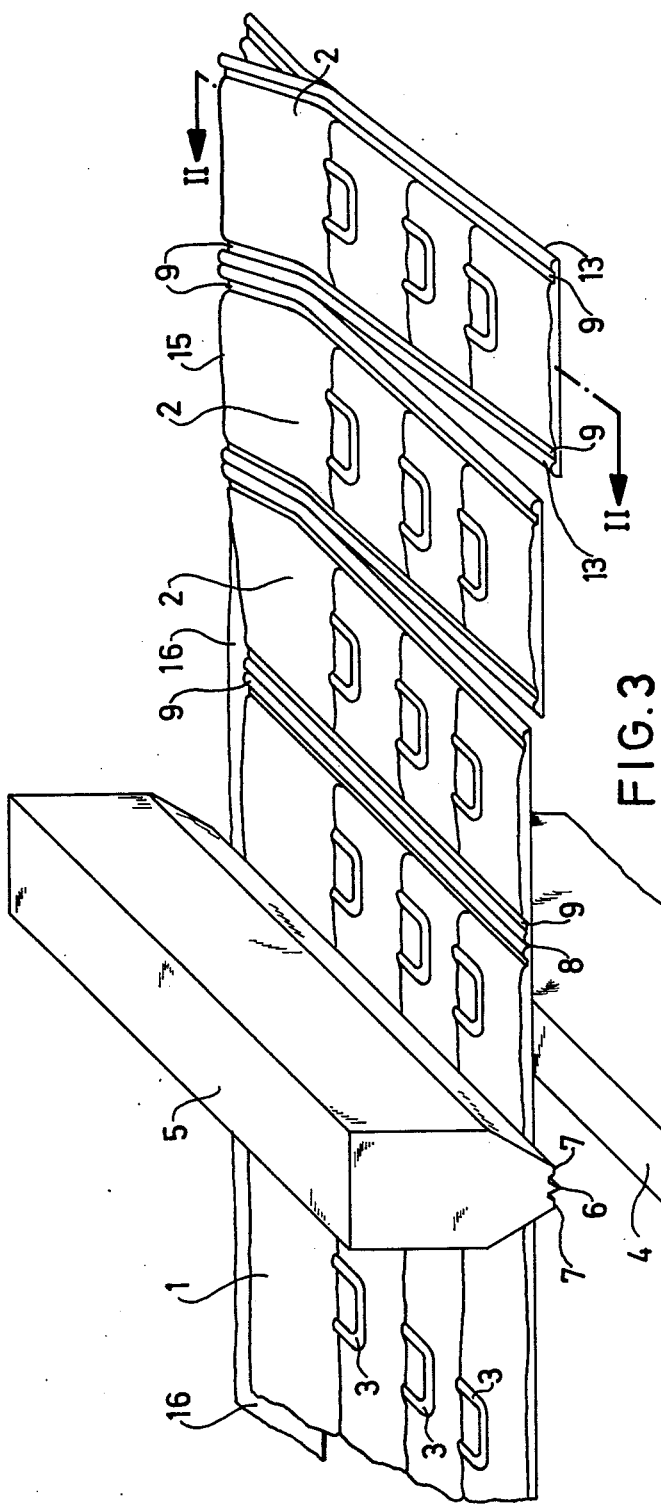
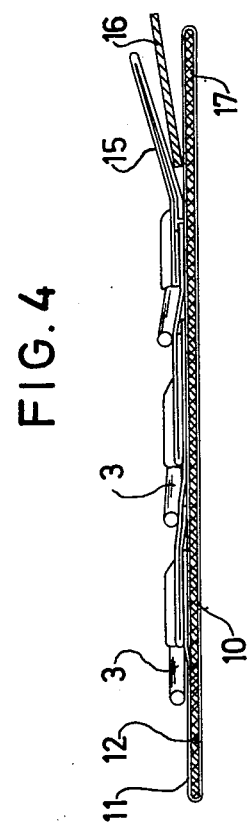
FIG. 3
FIG. 4

METHOD FOR PRODUCING CLOSING MEMBERS FOR SUPPORTING HOOKS OR EYES

The invention relates to a method and apparatus for producing closing members for supporting hooks or eyes for corsets, brassieres and the like and comprising continuous hook or eye tapes. Such hook and eye closures are presently produced by sewing hooks or eyes continuously, usually in a plurality of parallel rows, on support tapes which usually comprise cut broadloom fabrics of cotton or synthetic fibres. The hooks or eyes can be secured to the continuous tapes so that the interlocking plane extends parallel to the longitudinal axis of the tape or transversely thereto.

Hooks or eyes which are continuously sewn on the tape can be disposed thereon for example in rows of three hooks or eyes at identical distances from each other and they may be disposed on the support tape in so-called repeats, i.e. in groups of a plurality of transverse rows the distance of which from the next group is greater than the distance between transverse rows between a group. One such group or, where appropriate, individual transverse rows, are cut off from the continuous tape for attachment of the hooks or eyes to the garment. The cut edges of the cut tape part forming the individual closing member must then be hemmed or trim cut.

It is the object of the invention to simplify the manufacture of closing members for supporting the hooks or eyes and more particularly to substantially simplify or entirely eliminate the separation from a continuous support tape and hemming of the cut edges. According to the invention this is achieved in that the zones disposed between the transverse rows of hooks and eyes secured on the tape are rendered suitable for separation by linear welding under pressure through ultrasonics or high frequency when using woven or knitted fabrics of thermoplastics material for the tape which is advanced in steps at a predetermined stepped rhythm. Welding can be controlled so that the welding operation produces either only a line-shaped preferred frangible place or preferred tearing place or the welding operation is performed until the closing members are completely separated from each other. In both cases separation welding welds the fabric layers to the separating hook, thus dispensing with the need for hemming these edges.

To ensure joining of the fabric layers in the region of the separating edges, the welding operaton in one embodiment of the invention is performed in the separating zone so that at least one further welding line extends on each side of the linear preferred tearing position or on both sides of the line along which complete separation takes place so that parts of the fabric layers adjacent to the separating line are joined to each other by welding through the aforementioned further welding lines.

The welding operation in the separating zone can be performed until individual closing members or individual groups of closing members are completely separated from each other if further processing of the closing members is not to proceed from a continuous hook or eye tape but when it is intended to use individual closing members which have already been cut off and each is provided with one transverse row or a group of transverse rows of hooks and eyes which are to be stacked upon each other for dispatch, for example in boxes. The use of woven or knitted fabrics of thermoplastics material for the support tape is known. According to the invention the main characteristics of such woven and knitted fabrics are utilized to perform separation of the closing members from a continuous support tape and trimming of the cut edges of the individual closing members in a simple manner. Practical experience has shown that it is advantageous to provide inserts of a cotton fabric between woven fabrics or knitted fabrics of thermosplastics material when using multi-ply hook and eye tapes.

When closing members with hooks and eyes are attached to corset garments, it is desirable that the end of the rear part of the corset and the end of the closing member to be connected thereto are not situated one above the other but that the end of the rear part is accommodated to a specific depth in the edge zone the fabric plies forming the closing member. To this end two lips are formed from the securing edge of the closing member, one lip comprising the support fabric of the closing member or support tape and the other comprising covering strip raised therefrom. This permits a method of mounting in which the cut edge of the rear part of the corset or some other garment is not visible because it is inserted on the mounting edge of the closing member between individual plies thereof.

In order to achieve this advantage in the method according to the invention for producing closing members, a procedure according to a further embodiment of the invention proposes the formation of two lips in the edge zone for mounting the closing member on a garment namely by the insertion of a strip of non-weldable material between the top and bottom plies of the tape, the said plies of the tape being merely welded to each other at the side edges. This provides closing members whose mounting edges have two lips comprising plies of the closing member and being welded to each other along the separating edges at a right angle to the lip but in the region of the mounting edge are welded only on the edges of the two lips which are in flush alignment with the separating edges.

In a further embodiment of the invention welding is performed only as far as the tape edge zone which is provided for mounting on a garment. The plies are welded to the side edges of the two lips by means of an insert of non-weldable material only to the extent that the affected side edges of each lip are welded into each other. Cohesion of the material is maintained at least in the edge zone which is provided for mounting on a garment, a feature offering the advantage that the contiguous hook and eye closing members can be efficiently sewn on to the garment by means of conventional sewing machine guides. More particularly, this ensures reliable alignment of the closing members with respect to the ends or edges of the garments which are to be inserted between the lips.

In this case it is advantageous to use a non-weldable insert in the form of a stationary rail, the fastening edge of the tape or of the closing members which are still joined to each other being advanced so that the top plies of the tape extend over the rail while the remaining plies of the tape extend under the rail.

A device suitable for the method according to which the material of the closing members is contiguous in the mounting zone is constructed to comprise an anvil on which the support tape bears and a sonotrode having a cutting edge and pressure steps extending on both sides thereof and parallel thereto, the cutting edge being offset or blunted in the tape zone for mounting so as to perform a welding action but no cutting action on the tape in this zone. The two pressure webs can be continuous or can comprise pressure points arranged at short distances one after the other. In the last-mentioned case, welding produces rows of weld spots which give the impression of a seam.

The invention will now be described by way of example with reference to the drawings wherein:

FIG. 1 is a perspective view of a device suitable for performing the method;

FIG. 2 is a section along line A—B of FIG. 1;

FIG. 3 is a perspective view of a welding device adapted to form lips at the edge of an eyelet tape by an insertion of a strip of non-weldable material between the plies;

FIG. 4 is a cross-section along the line II—II of FIG. 3;

Figure 7:
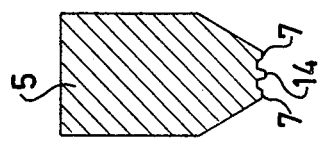
FIGS. 6 and 7 are cross-sections through the sonotrode along the lines IV—IV and V—V of FIG. 5.
Figure 6:
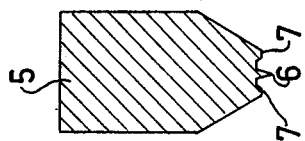
Figure 5:
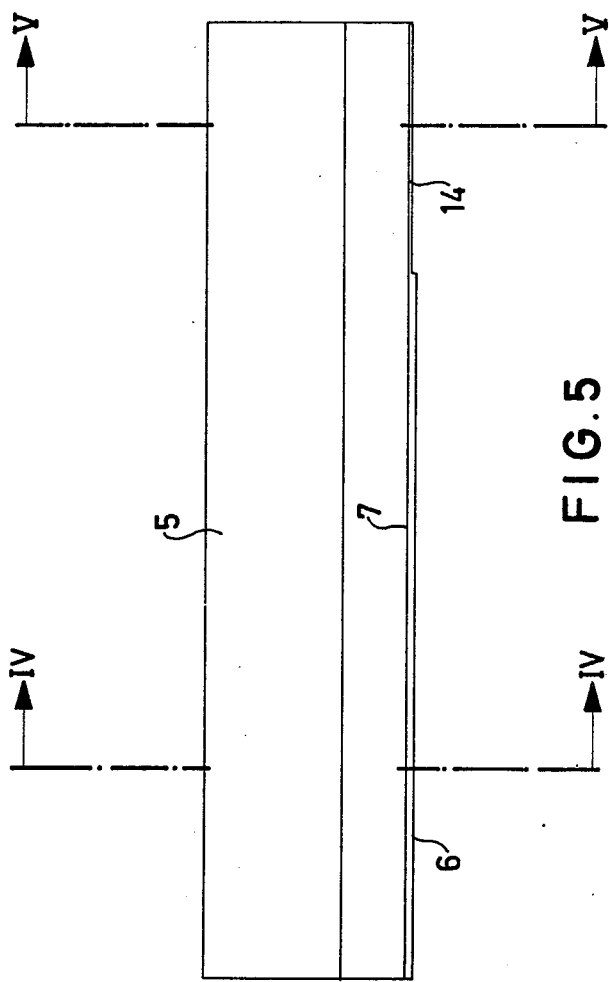
FIG. 5 is a side view of the sonotrode of the device illustrated in FIG. 1.
Figure 8:
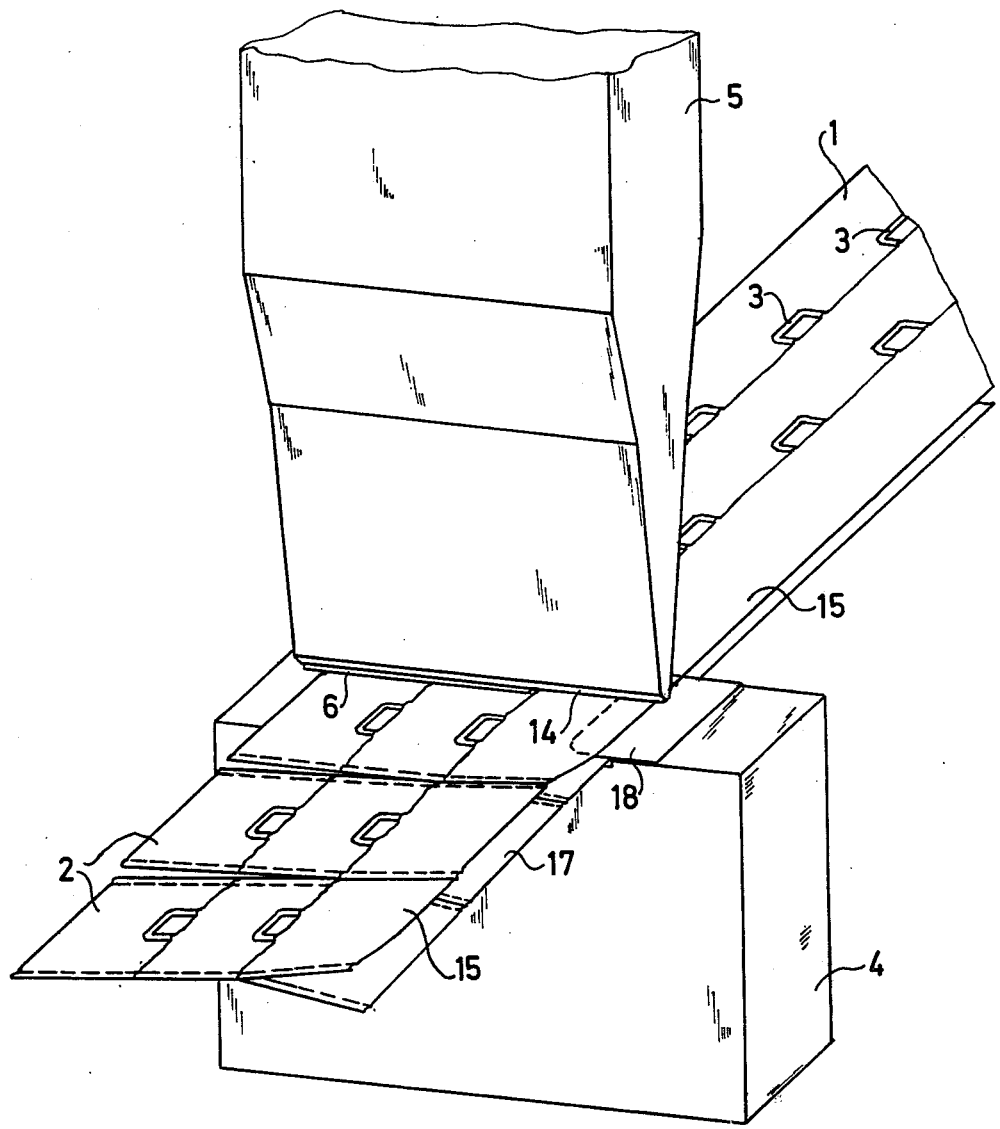
FIG. 8 is a device in which a stationary insert of non-weldable material engages in one edge zone of the tape between the plies of the eyelet tape.

The contiguous eyelet tape 1 supplied from the left-hand side in FIGS. 1 and 3 and from the right-hand side in FIG. 8, is provided in a known manner with eyelets 3 arranged in transverse rows. The tape is guided in steps between an anvil 4 and a sonotrode 5. A pressure edge 6 in the form of a cutting edge is formed on the sonotrode. The two recessed pressure webs 7 extend on both sides of the pressure edge.

The consequence of the welding operation which is performed by ultrasonics and under pressure, is that the closing members 2, each having a transverse row of eyelets, are rendered suitable for being separated from each other namely along a notch 8 which is produced by the cutting edge 6 to facilitate tearing off the individual closing members from the tape and from each other as illustrated in the right-hand part of FIG. 1. The separating welding operation welds the cutting edges 13 of the individual closing members 2 to each other. Further welding of the fabric edges under the action of the pressure webs 7 takes place simultaneously at a short distance from the cutting line along the lines 9.

The welding operation can be performed so that cohesion between the individual closing members 2 is immediately eliminated so that it is no longer necessary to tear off the parts 2 from the tape 1.

FIG. 2 is a sectional drawing showing the multi-ply construction of the support tape. The bottom ply 10 and the top ply 11 comprise knitted fabric of thermoplastics filaments. An insert 12 of cotton fabric is disposed between these plies.

In the example illustrated in FIGS. 3 to 8 the eyelet tape 1 is also guided in steps between the anvil 4 and the sonotrode 5. A strip 16 of non-weldable material is inserted between the plies 15 of the cover strip and the remaining plies 17 of the tape in the edge zone of the eyelet tape by means of which the closing members are secured on a garment, so that welding in this zone does not extend vertically through all plies but an open lip is formed.

The multi-ply construction of the eyelet tape is disclosed in the sectional view of FIG. 4. The bottom ply 10 and the top ply 11 comprise a knitted fabric of thermoplastic filament material. An insert 12 of cotton fabric is disposed between these two plies. FIG. 4 also discloses the strip 16 of non-weldable material, for example silicone or wax paper.

In the embodiment of the invention illustrated in FIG. 8, the cutting edge 6 is recessed or blunted in the zone 14 disposed above the eyelet tape edge for fastening so that a welding action but no cutting action is performed on the tape in this zone.

This construction dispenses with the need for inserting a strip of non-weldable material into the edge zone of the eyelet tape. In this case a short rail or tongue 18 of non-weldable material is disposed on the top of the anvil 4 so as to engage between the plies of one edge zone of the eyelet tape 1. The cutting edge 6 of the sonotrode 5 extends only as far as the edge zone of the eyelet tape so that the recessed edge 14 produces a weld but no separation in the edge zone of eyelet tape.

We claim:

1. A method for producing closing members from contiguous hook or eye tapes comprising top and bottom plies (10 and 11) made of thermoplastic material, a fabric insert (12) disposed between the two thermoplastic plies (10 and 11), and a cover strip 15 on which contiguous hooks or eyelets (3) are arranged in transverse rows, said method comprising the steps of:
   a. advancing the tapes at a predetermined stepped rhythm;
   b. forming two lips
      i. in the edge zone of the tapes
      ii. for attachment of the closing member to a garment
      iii. by the insertion of a strip (16) of non-weldable material between the cover strip (15) and the top ply (11), which strip (16), however, does not prevent the edges of the two lips from being simultaneously welded by a single welding operation on one side of one of the lips; and
   c. welding the cover strip (15) to the top ply (11) in the portion of the tapes other than the two lips, the side edge of the top ply (11) to the side edge of the bottom ply (10) in the two lips, and the side edge of the cover strip (15)
      i. at right angles to the lips,
      ii. by a single ultrasonic or high frequency linear welding operation on one side of the tapes,
      iii. while the plies are temporarily stopped,
      iv. until zones disposed between the transverse rows of hooks or eyes secured on the tapes are rendered suitable for separation.

2. A method according to claim 1, wherein the welding operation is performed by the provision of one further welding line on each side of the zones, parts of the plies adjacent to the zones being joined to each other by the further welding line.

3. A method according to claim 2, wherein the welding operation in the separating zone is continued until individual closing members or individual groups of closing members are separated from each other.

4. A method according to claim 1, wherein to maintain material contiguity of the closing members the weld for separating the individual closing members from each other or for rendering them suitable for being separated from each other extends to the edge zone of the tape, the plies being welded together on the side edges of the two lips by means of an insert of non-weldable material to the extent to which the affected side edges of each lip are welded into themselves.

5. A method according to claim 4, wherein the fastening edge of the tape during the stepped progress thereof is displaced along a stationary rail used as a non-weldable insert so that the top plies of the tape extend over the rail while the remaining plies of the tape extend under the rail.

6. A method according to claim 5, wherein at least one further welding line extends over the entire width of the tape on each side of the linear separation weld.

* * * * *